(12) United States Patent  (10) Patent No.: US 7,932,935 B2
Takei  (45) Date of Patent: Apr. 26, 2011

(54) IMAGING APPARATUS CAPABLE OF REDUCING DETERIORATION OF AN IMAGE EVEN WHEN THE GAIN INCREASED

(75) Inventor: Hirofumi Takei, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 865 days.

(21) Appl. No.: 11/668,284

(22) Filed: Jan. 29, 2007

(65) Prior Publication Data

US 2007/0188634 A1  Aug. 16, 2007

(30) Foreign Application Priority Data

Feb. 14, 2006  (JP) ................. 2006-035925

(51) Int. Cl.
*H04N 5/217* (2006.01)
*H04N 5/208* (2006.01)

(52) U.S. Cl. ...................... 348/241; 348/252

(58) Field of Classification Search .................. None
See application file for complete search history.

(56) References Cited

U.S. PATENT DOCUMENTS

| 5,926,224 | A | 7/1999 | Nagasawa | |
| 6,542,186 | B2 * | 4/2003 | Uryu | 348/231.7 |
| 6,931,160 | B2 * | 8/2005 | Gindele et al. | 382/261 |
| 7,194,135 | B2 * | 3/2007 | Satou et al. | 382/236 |
| 7,236,190 | B2 * | 6/2007 | Yanof et al. | 348/222.1 |
| 7,545,993 | B2 * | 6/2009 | Matsuda et al. | 382/275 |
| 2005/0157188 | A1 | 7/2005 | Kubo | |

FOREIGN PATENT DOCUMENTS

| JP | 06-303464 A | 10/1994 |
| JP | 2005-210215 A | 8/2005 |
| WO | 97/05745 A1 | 2/1997 |

* cited by examiner

*Primary Examiner* — Luong T Nguyen
(74) *Attorney, Agent, or Firm* — Canon USA, Inc. IP Division

(57) ABSTRACT

An imaging apparatus includes an imaging unit configured to image an object, a gain adjustment unit configured to adjust a gain for an image signal output from the imaging unit, a signal processing unit configured to process the image signal, the signal processing unit including a first noise reduction unit to reduce a particular noise included in the image signal, an image compression unit configured to compress an image signal output from the signal processing unit, the image compression unit including a second noise reduction unit to reduce the particular noise included in the image signal output from the signal processing unit, and a control unit configured to set one of the first and second noise reduction units into an operative state and another unit into an inoperative state according to a gain adjustment by the gain adjustment unit.

21 Claims, 10 Drawing Sheets

FIG.11

| | NOISE REDUCTION PROCESSING IN SIGNAL PROCESSING UNIT (SETTING VALUE) | | NOISE REDUCTION PROCESSING IN IMAGE COMPRESSION UNIT | |
|---|---|---|---|---|
| | THREE-DIMENSIONAL FILTER | SPATIAL FILTER | THREE-DIMENSIONAL FILTER | SPATIAL FILTER |
| WITHOUT GAIN INCREASE | OFF | OFF | OFF | OFF |
| | OFF | ON | OFF | OFF |
| | ON | OFF | OFF | OFF |
| | ON | ON | OFF | OFF |
| WITH GAIN INCREASE | OFF | ON | ON | ON |
| | OFF | OFF | ON | OFF |
| | ON | ON | OFF | ON |
| | ON | ON | OFF | OFF |

IMAGING APPARATUS CAPABLE OF REDUCING DETERIORATION OF AN IMAGE EVEN WHEN THE GAIN INCREASED

BACKGROUND OF THE INVENTION

1. Field of the Invention

The present invention relates to an imaging apparatus, and more particularly, to an imaging apparatus including a noise reducing function.

2. Description of the Related Art

In recent years, a technique for processing a digital signal has been developed, and thus a large amount of digital information, e.g., a moving image, a still image, sound, or the like, can be easily compressively coded so as to be recorded on a small recording medium or transmitted to a communication medium. More particularly, in the field of compression coding of an image, a standard technique for moving image coding, e.g., MPEG-2 (Moving Picture Experts Group phase 2), has become widely used, and digital video cameras using MPEG-2 has come into practical use.

An imaging function of a digital video camera includes a function referred to as a gain increase. A photographer can perform high-sensitive shooting by intentionally increasing the gain of an amplifier. However, when the gain-increased image signal is compressed with MPEG-2, image quality may be deteriorated by a random noise component.

A cause of that problem is as follows. Since random noise components in the image signal caused by the gain increase do not correlate with each other between each frame, each noise component is determined as movement of an image. Thus, a great number of coding bits are allotted to the noise. As a result of this, the number of bits which should be allotted to original image information decreases, and thus, image quality after the compression coding is largely deteriorated. To prevent the deterioration of image quality, a configuration for controlling filter processing characteristics of an image compression unit according to a gain increase is discussed in U.S. Pat. No. 5,926,224 (corresponding to International Publication No. WO/1997/005745).

Furthermore, a recent multifunction digital video camera includes a noise reduction filter, with which a photographer can set a noise elimination level so as to directly output a noise-reduced image signal to an external. Thus, the digital video camera includes a terminal adapted to directly output an image signal from a camera unit (a camera image signal) to an external image monitor, a video recording apparatus, or the like.

Since a video camera capable of outputting an image signal from a camera unit to an external includes noise reduction units both in the camera unit and an image compression unit, an excessive amount of noise reduction may be applied at the time of recording an image signal. As a result, a high-frequency component of the image signal may be lost and image quality may be deteriorated. This problem is noticeable when a photographer sets a noise reduction level in the camera unit to high and increases the gain of an amplifier.

In the configuration discussed in U.S. Pat. No. 5,926,224, a camera unit of the video camera does not include a noise reduction unit. Thus, when a camera image signal is directly output to an external with the gain increased, a noise of the camera image signal cannot be adjusted.

SUMMARY OF THE INVENTION

The present invention is directed to an imaging apparatus capable of reducing deterioration of an image even when the gain is increased.

The present invention is also directed to an imaging apparatus capable of adjusting a noise of a camera image signal output to an external.

According to an aspect of the present invention, an imaging apparatus includes an imaging unit configured to image an object, a gain adjustment unit configured to adjust a gain for an image signal output from the imaging unit, a signal processing unit configured to process the image signal, the signal processing unit including a first noise reduction unit to reduce a particular noise included in the image signal, an image compression unit configured to compress an image signal output from the signal processing unit, the image compression unit including a second noise reduction unit to reduce the particular noise included in the image signal output from the signal processing unit, and a control unit configured to set one of the first and second noise reduction units into an operative state and another unit into an inoperative state according to a gain adjustment by the gain adjustment unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 illustrates the relationship between a gain increase and a spatial filter or a three-dimensional filter according to an aspect of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
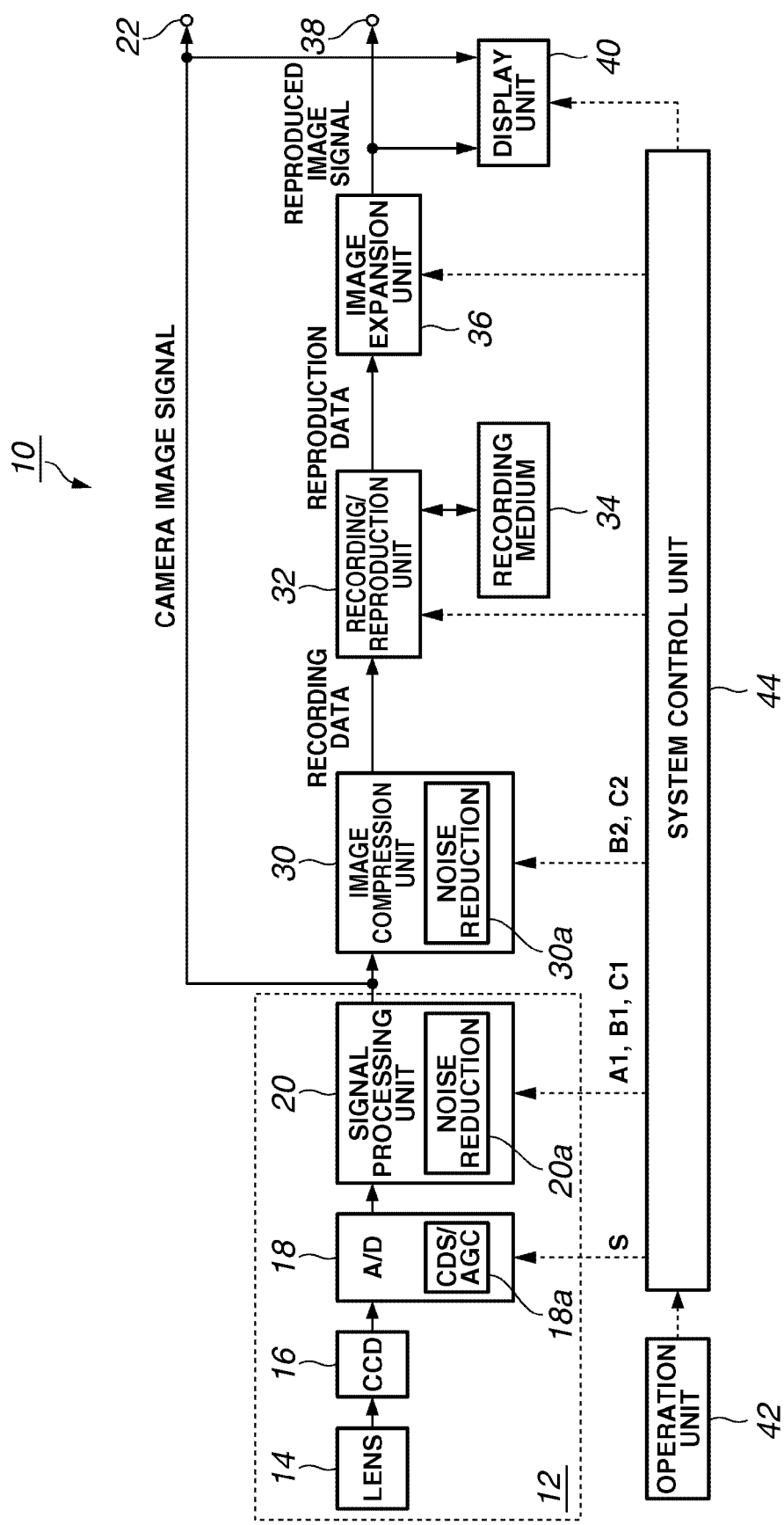
FIG. 1 is a block diagram showing an exemplary configuration of a camcorder according to an aspect of the present invention.

A first exemplary embodiment of the present invention will now herein be described. FIG. 1 is a block diagram showing an exemplary configuration of a camcorder 10 according to the first exemplary embodiment of the present invention. In FIG. 1, continuous lines indicate the flow of an image signal and dashed lines indicate the flow of a control signal.

A camcorder 10 is a digital video camera but may be a digital still camera or the like. The camcorder 10 includes an imaging unit 12, a camera image signal output terminal 22, an image compression unit 30, a recording/reproduction unit 32, a recording medium 34, an image expansion unit 36, a reproduced image signal output terminal 38, a display unit 40, an operation unit 42, and a system control unit 44.

The imaging unit 12 includes a lens system 14, a charge-coupled device (CCD) image sensor 16, an analog-to-digital conversion unit (A/D) 18, and a signal processing unit 20.

The lens system 14 includes a lens, a zoom mechanism, a focus mechanism, a diaphragm, and the like. The lens system 14 forms an optical image from an object on an imaging plane of the CCD image sensor 16. The CCD image sensor 16 converts the optical image from the lens system 14 into an electrical signal.

The A/D conversion unit 18 includes a correlated double sampling (CDS)/auto gain control (AGC) 18a and an A/D converter. The A/D conversion unit 18 converts the electrical signal from the CCD image sensor 16, that is, an analog image signal, into a digital image signal. The signal processing unit 20 executes color correction processing, gamma correction, white balance adjustment, and matrix processing on the digital image signal from the A/D conversion unit 18. Then, the signal processing unit 20 outputs a camera image signal to the image compression unit 30, the camera image signal output terminal 22, and the display unit 40. Further, the signal processing unit 20 includes a noise reduction unit 20a including a three-dimensional filter or a spatial filter.

The image compression unit 30 compresses the camera image signal from the signal processing unit 20 based on an image compression system, e.g., MPEG-2, H.264 (AVC), Motion JPEG, JPEG2000, or the like. The image compression unit 30 includes a noise reduction unit 30a including a three-dimensional filter or a spatial filter. In addition, the noise reduction unit 30a is used for a smoothing processing of an image to be coded before or after the image compression.

The recording/reproduction unit 32 records compression image data from the image compression unit 30 on the recording medium 34 as recording data. Further, the recording/reproduction unit 32 reproduces compression image data recorded on the recording medium 34 and transfers the reproduction data to the image expansion unit 36. The recording medium 34 is a hard disk, an optical disk, a magneto-optical disk, a magnetic tape, or a nonvolatile memory card.

The image expansion unit 36 expands the compression image data from the recording/reproduction unit 32. The image signal output from the image expansion signal 36 is a reproduced image signal. The reproduced image signal is output to the reproduced image signal output terminal 38 and the display unit 40.

The display unit 40 includes a liquid crystal display panel and a drive unit for the panel. The display unit 40 displays the camera image signal or the reproduced image signal as an image. The operation unit 42 includes an imaging switch, a reproduction switch, a recording switch, and the like and is used for operating each operation of imaging, reproducing, and recording. Further, the operation unit 42 is used for operating display of a camera setting menu screen.

The system control unit 44 is configured to control the camcorder 10, and especially control an auto gain control in the A/D conversion unit 18, the noise reduction unit 20a in the signal processing unit 20, and the noise reduction unit 30a in the image compression unit 30. The system control unit 44 produces various control signals for controlling operations of each unit, and control signals S, A1, B1, C1, B2 and C2 will be described below.

Now, an exemplary imaging operation, am exemplary recording operation, and an exemplary reproducing operation of the camcorder 10 will be described. In an imaging mode, the CCD image sensor 16 outputs an image signal representing an object image. The A/D conversion unit 18 converts the image signal from the CCD image sensor 16 into a digital image signal and supplies the digital image signal to the signal processing unit 20. The signal processing unit 20 executes camera signal processing, e.g., gamma correction, and color correlation processing, on the digital image signal from the A/D conversion unit 18. At this time, the image signal to be output from the signal processing unit 20 is temporarily stored in a frame memory incorporated in the signal processing unit 20 and is subjected to a noise reduction processing if necessary. Then, the image signal is transferred to the display unit 40 to be displayed on a screen of the display unit 40 in the order of storage. Accordingly, a user can confirm a range and composition of the object.

In a recording mode, the image signal temporarily stored in the frame memory is also transferred to the image compression unit 30. The image compression unit 30 compressively codes the camera image signal from the signal processing unit 20 and supplies the compressed image data to the recording/reproduction unit 32. The recording/reproduction unit 32 records the compressed image data on the recording medium 34. With this processing, image data including a series of images is stored in the recording medium in a compressed state.

In a reproduction mode, the recording/reproduction unit 32 reads out compressed image data of a specified image from the recording medium 34 and transfers the compressed image data to the image expansion unit 36. The image expansion unit 36 expands the compressed image data form the recording/reproduction unit 32 to restore image data. The restored image data, that is, a reproduced image signal, is supplied to the display unit 40. With this processing, a reproduced image is displayed on the screen of the display unit 40.

Figure 2:
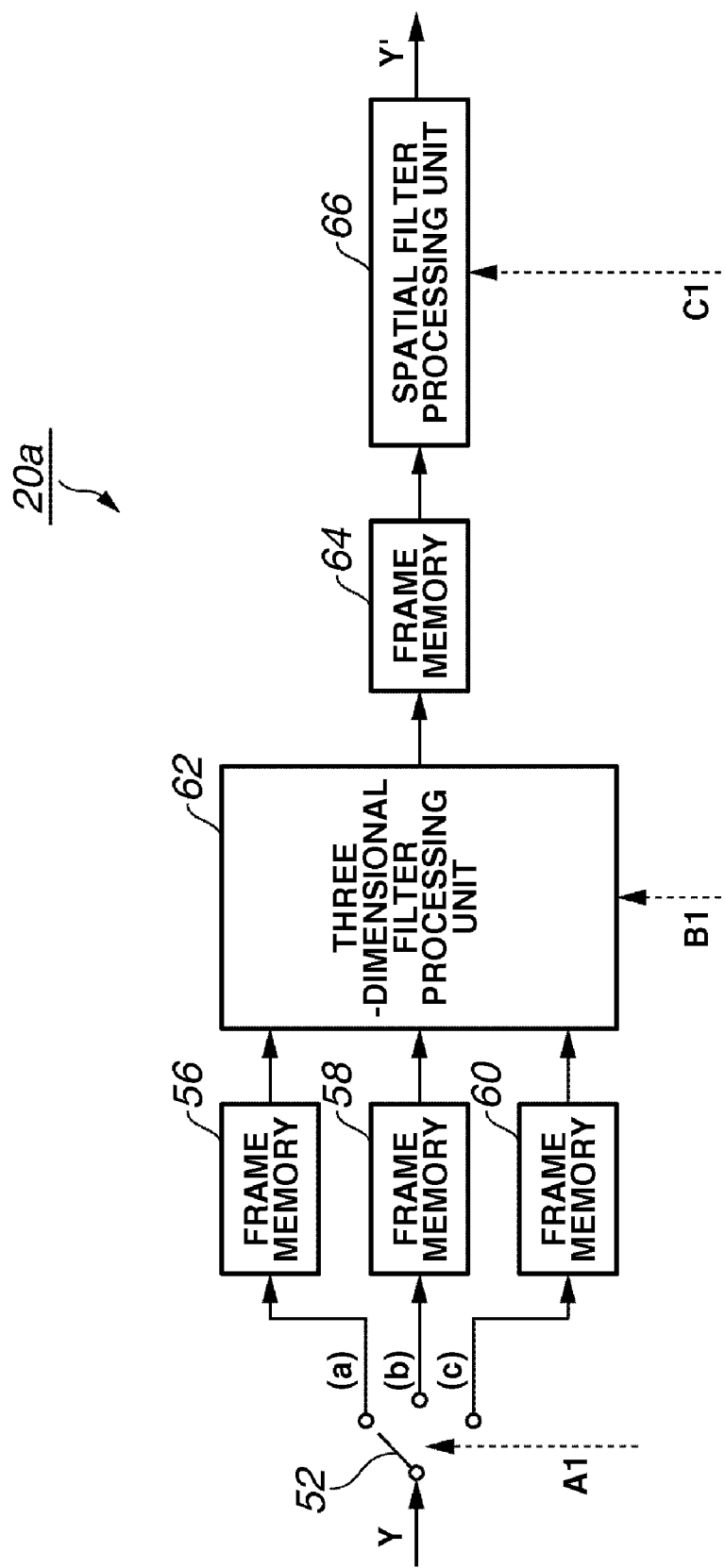
FIG. 2 a block diagram showing an exemplary configuration of a noise reduction unit according to an aspect of the present invention.

FIG. 2 a block diagram showing an exemplary configuration of the noise reduction unit 20a in the signal processing unit 20. The signal processing unit 20 is configured to generate a luminance signal (Y) and color-difference signals (Cr, Cb) and executes noise reductions on the luminance signal and the color-difference signals. In order to simplify descriptions, only a portion associated with the luminance signal (Y) is illustrated in FIG. 2. Control signals A1, B1 and C1 are supplied from the system control unit 44.

As illustrated in FIG. 2, the noise reduction unit 20a includes a selector 52, frame memories 56, 58 and 60, a three-dimensional filter processing unit 62, a frame memory 64, and a spatial filter processing unit 66.

The selector 52 is cyclically switched to terminals (a), (b) and (c) in the order of frames in an image signal to be processed, based on the control signal A1 supplied from the system control unit 44, which indicates switching of frames. More specifically, the selector 52 sequentially operates to store a luminance signal (Y) of the first frame in the frame memory 56, to store a luminance signal (y) of the second frame in the frame memory 58, to store a luminance signal (Y) of the third frame in the frame memory 60, and to store a luminance signal (Y) of the forth frame in the frame memory 56. The selector 52 repeats this processing in the case of a moving image.

The three-dimensional filter processing unit 62 enables or disables thee-dimensional filter processing of image data stored in the frame memories 56, 58 and 60 according to the control signal B1 supplied from the system control unit 44. More specifically, when the control signal B1 indicates ON (enable), the three-dimensional filter processing unit 62 executes three-dimensional filter processing of image data stored in the frame memories 56, 58 and 60 in the above-described order and outputs the processing results to the frame memory 64. On the other hand, when the control signal B1 indicates OFF (disable), the three-dimensional filter processing unit 62 directly outputs the present image data in the image data stored in the frame memories 56, 58 and 60 to the frame memory 64.

The spatial filter processing unit 66 enables or disables spatial filter processing of image data stored in the frame memory 64 according to the control signal C1 supplied from the system control unit 44. More specifically, when the control signal C1 indicates ON (enable), the spatial filter processing unit 66 executes spatial filter processing of image data stored in the frame memory 64 and outputs the processing result. On the other hand, when the control signal C1 indicates OFF (disable), the spatial filter processing unit 66 directly outputs the image data stored in the frame memory 64.

The camera signal processing unit 20 executes edge enhancement processing, color correction processing, and the like on the image data processed by the noise reduction processing unit 20a and outputs the processing result to the image compression unit 30, the display unit 40, and the camera output terminal 22.

Figure 3:
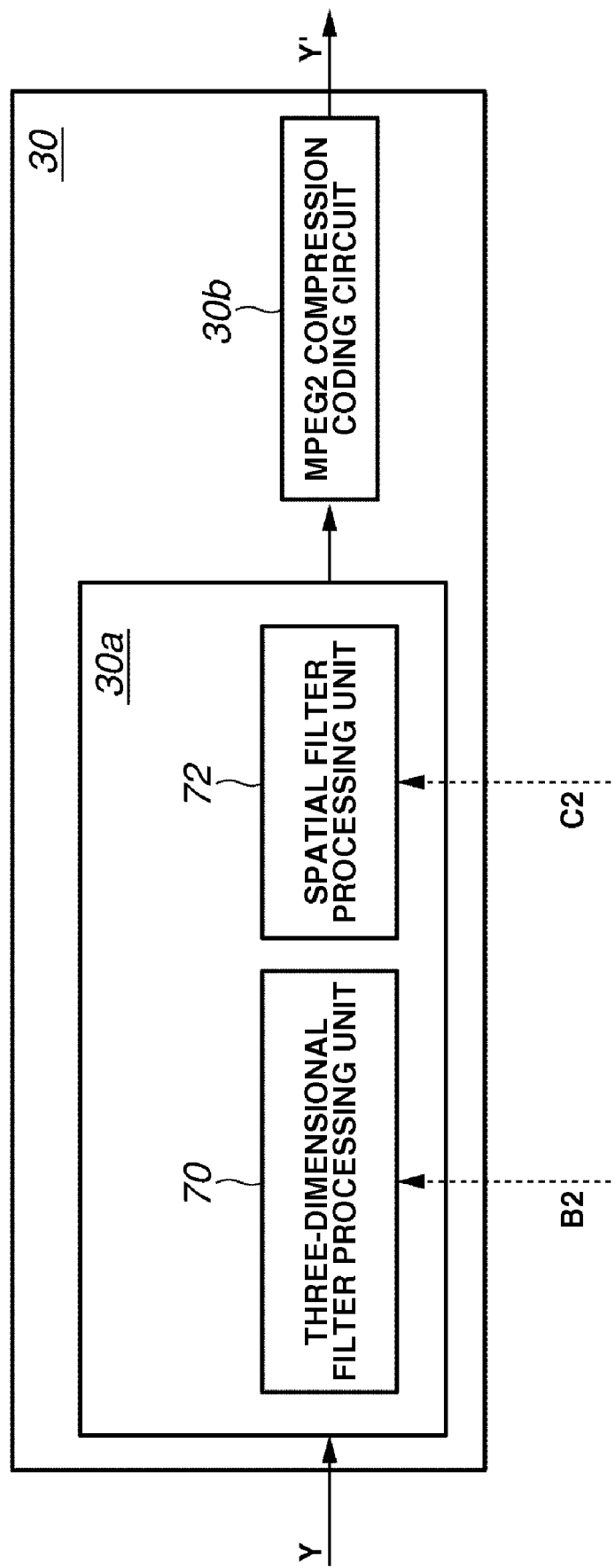
FIG. 3 is a block diagram showing an exemplary configuration of an image compression unit according to an aspect of the present invention.

FIG. 3 is a block diagram showing an exemplary configuration of the image compression unit 30. The image compression unit 30 includes a noise reduction unit 30a and an MPEG2 compression coding circuit 30b. The noise reduction unit 30a has a configuration similar to that of the noise reduction unit 20a shown in FIG. 2. FIG. 3 illustrates a three-dimensional filter processing unit 70 and a spatial filter processing unit 72 as typical elements of the noise reduction unit 30a. The control signal B2 supplied from the system control unit 44 is an enable/disable signal which enables or disables the three-dimensional filter processing unit 70. The control signal C2 is an enable/disable signal which enables or disables the spatial filter processing unit 72. Operations according to the control signals B2 and C2 are similar to those described with reference to FIG. 2.

Figure 4:
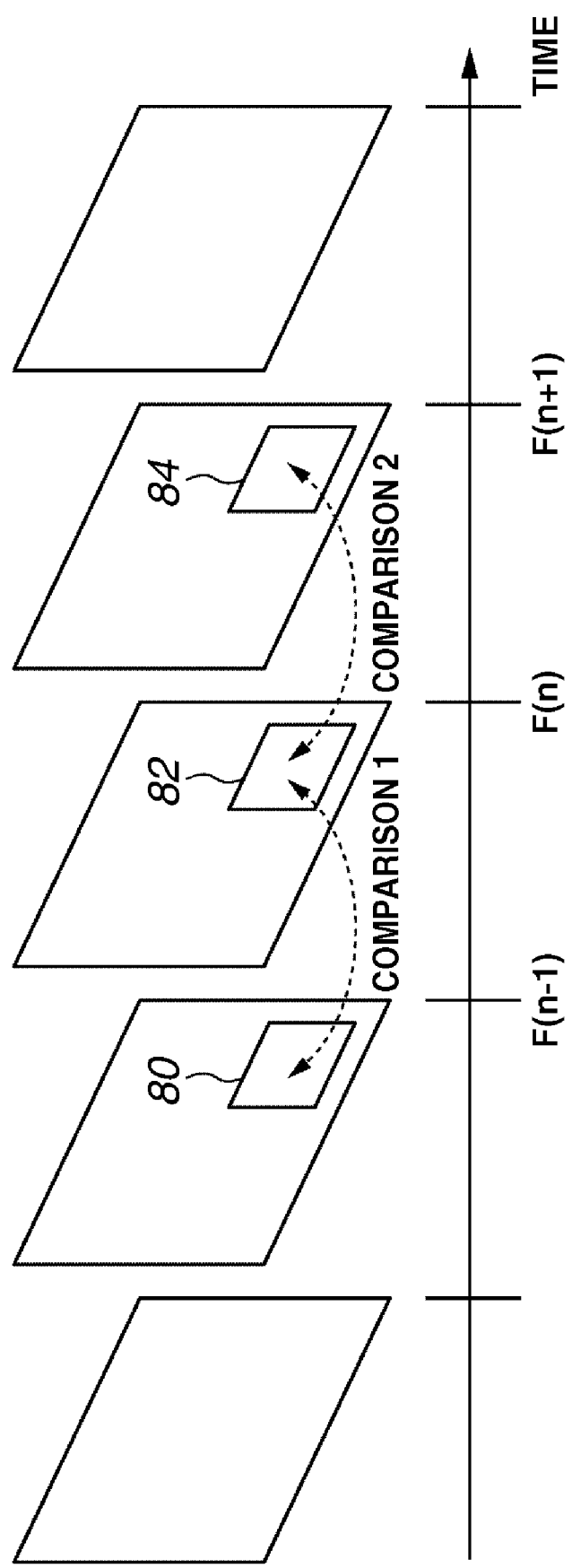
FIG. 4 is a schematic view illustrating a processing method of a three-dimensional filter processing according to an aspect of the present invention.
Figure 5:
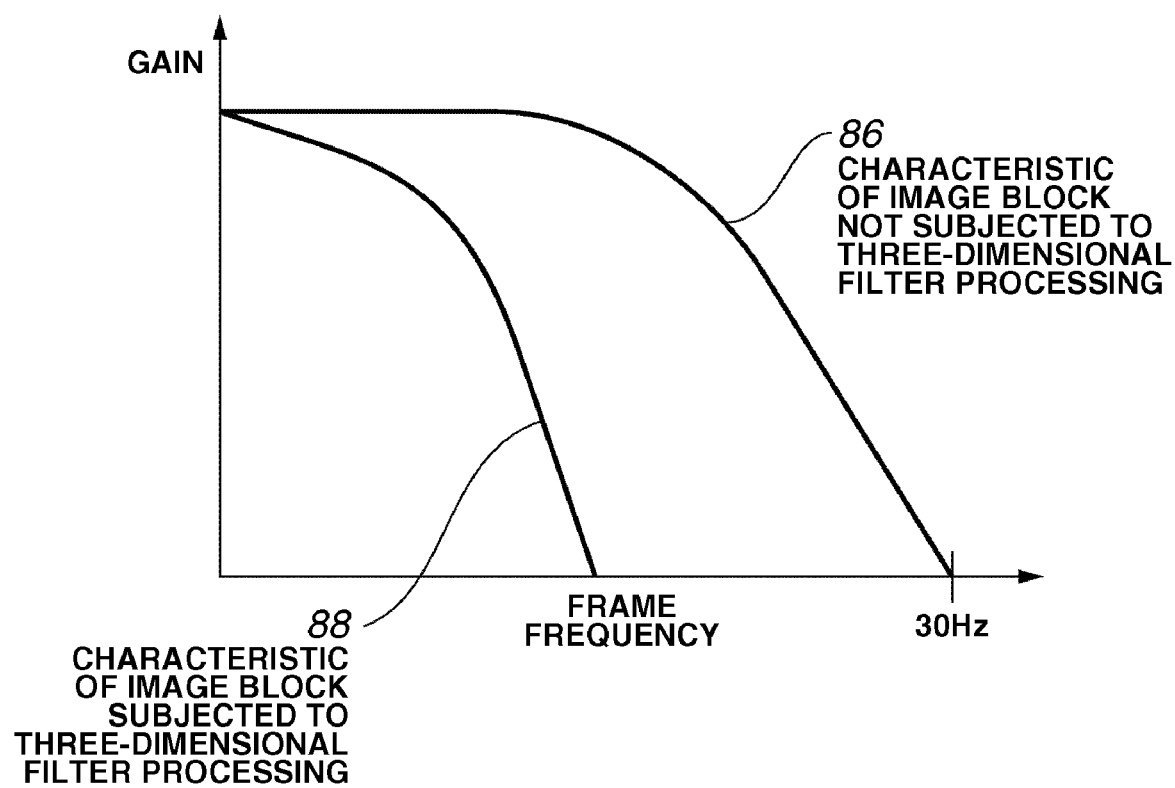
FIG. 5 is a diagram showing an example of frequency characteristics of a three-dimensional filter according to an aspect of the present invention.

The three-dimensional filter processing will be described below. FIG. 4 is a schematic view illustrating an exemplary processing method of the three-dimensional filter processing. FIG. 5 is a diagram showing an example of frequency characteristics of a three-dimensional filter.

In FIG. 4, frames F(n−1), F(n), and F(n+1) indicate image data stored in the frame memories 56, 58, and 60, respectively, in order. An image block 82 of the frame F(n) is compared with each of corresponding image blocks 80 and 84 of the frames F(n−1) and F(n+1) on a block-by-block basis. Then, if both differences are a predetermined value or less, the frame F(n) is determined as a still image and is averaged with corresponding pixels of the frames F(n−1), F(n), and F(n+1). If any one of the differences is greater than the predetermined value, the frame F (n) is determined as a moving image, and pixel values of the frame F(n) are directly output. It is publicly known that averaging processing of a still image reduces noise.

FIG. 5 is a diagram illustrating an example of characteristics of the three-dimensional filter processing on an image signal of 30 frames/second. The horizontal axis indicates frame frequency and the vertical axis indicates gain. A curve 86 indicates the characteristic of an image block which is not subjected to the three-dimensional filter processing. A curve 88 indicates the characteristic of an image block which is subjected to the three-dimensional filter processing.

Figure 6:
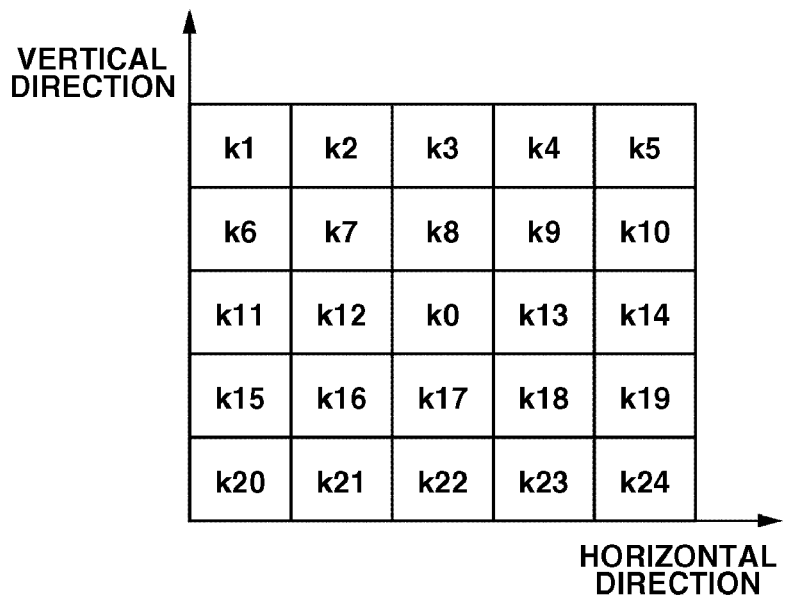
FIG. 6 is an example of weighting coefficients used for a spatial filter processing according to an aspect of the present invention.
Figure 7:
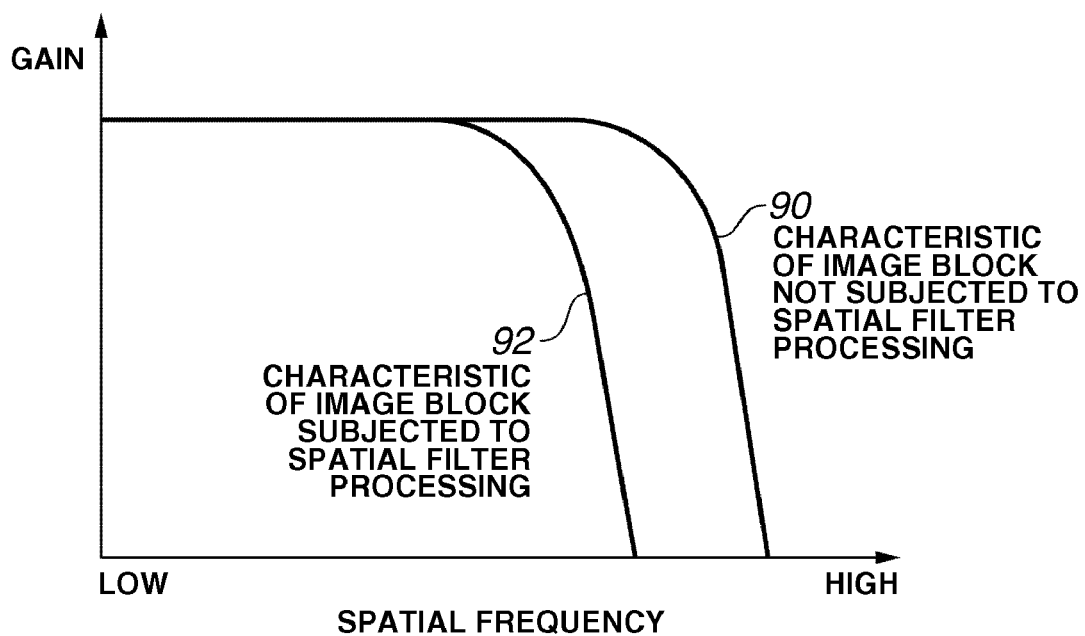
FIG. 7 is a diagram showing an example of frequency characteristics of a spatial filter according to an aspect of the present invention.

Exemplary spatial filter processing will be described next. FIG. 6 illustrates an example of weighting coefficients used for the spatial filter processing. FIG. 7 is a diagram illustrating an example of frequency characteristics of a spatial filter.

For example, an image block composed of 5 pixels×5 pixels in the horizontal and vertical directions centering on a target pixel in image data is considered. A value of the target pixel is multiplied by a weighting coefficient k0, and pixels around the target pixel are respectively multiplied by coefficients k1 to k24. Then, 25 multiplied results are summed. Such a processing is known as a finite impulse response (FIR) filter method. This method properly sets values of the coefficients k0 to k24 to obtain a desired characteristic of spatial frequency.

With such calculations, characteristics of the spatial filter processing as illustrated in FIG. 7 can be obtained, so that a high-frequency noise component can be reduced. In FIG. 7, the horizontal axis indicates spatial frequency and the vertical axis indicates gain. A curve 90 indicates the characteristic of an image block which is not subjected to the spatial filter processing. A curve 92 indicates the characteristic of an image block which is subjected to the spatial filter processing.

Figure 8:
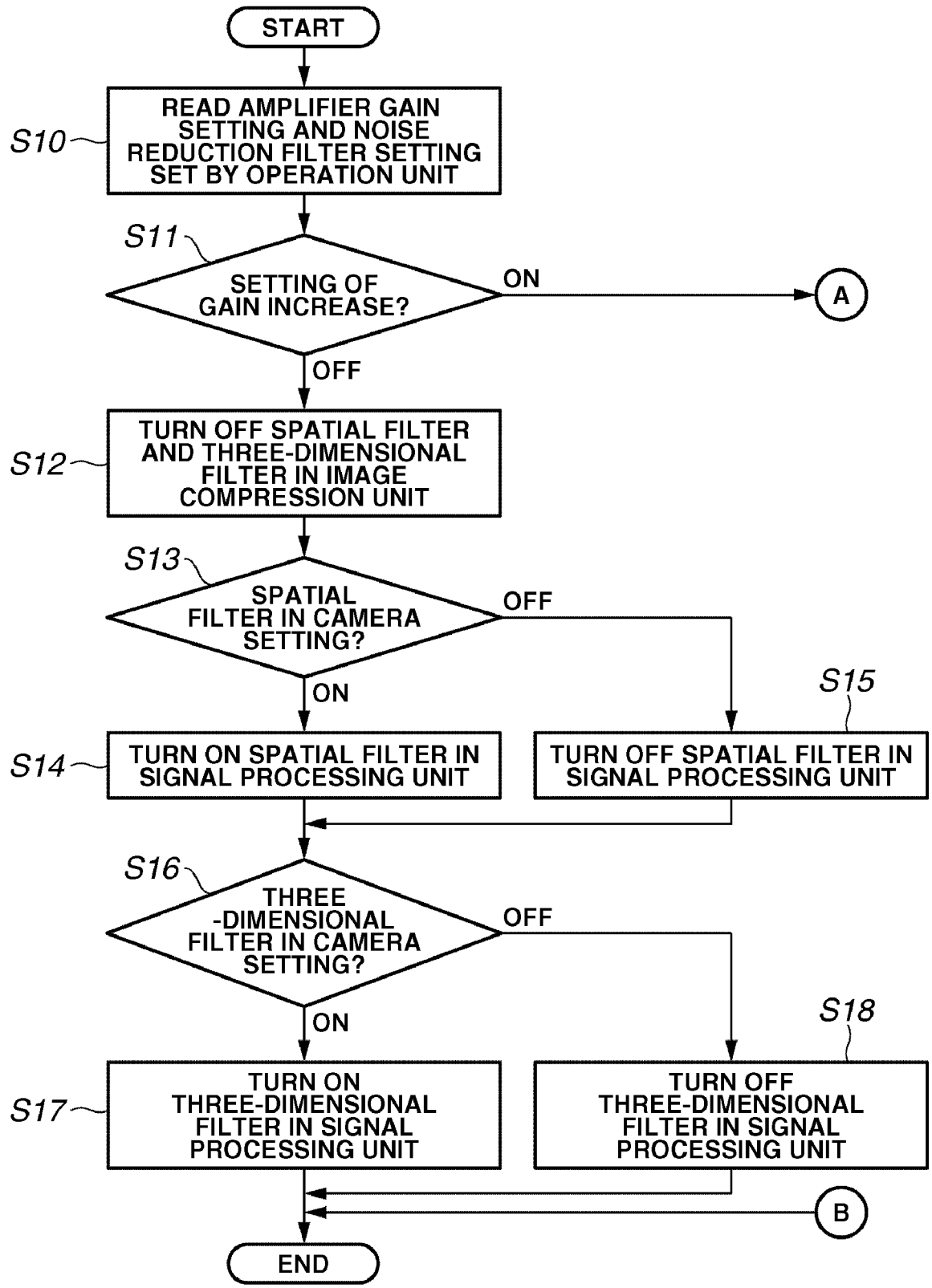
FIG. 8 is a flowchart illustrating control of a noise reduction unit according to an aspect of the present invention.
Figure 9:
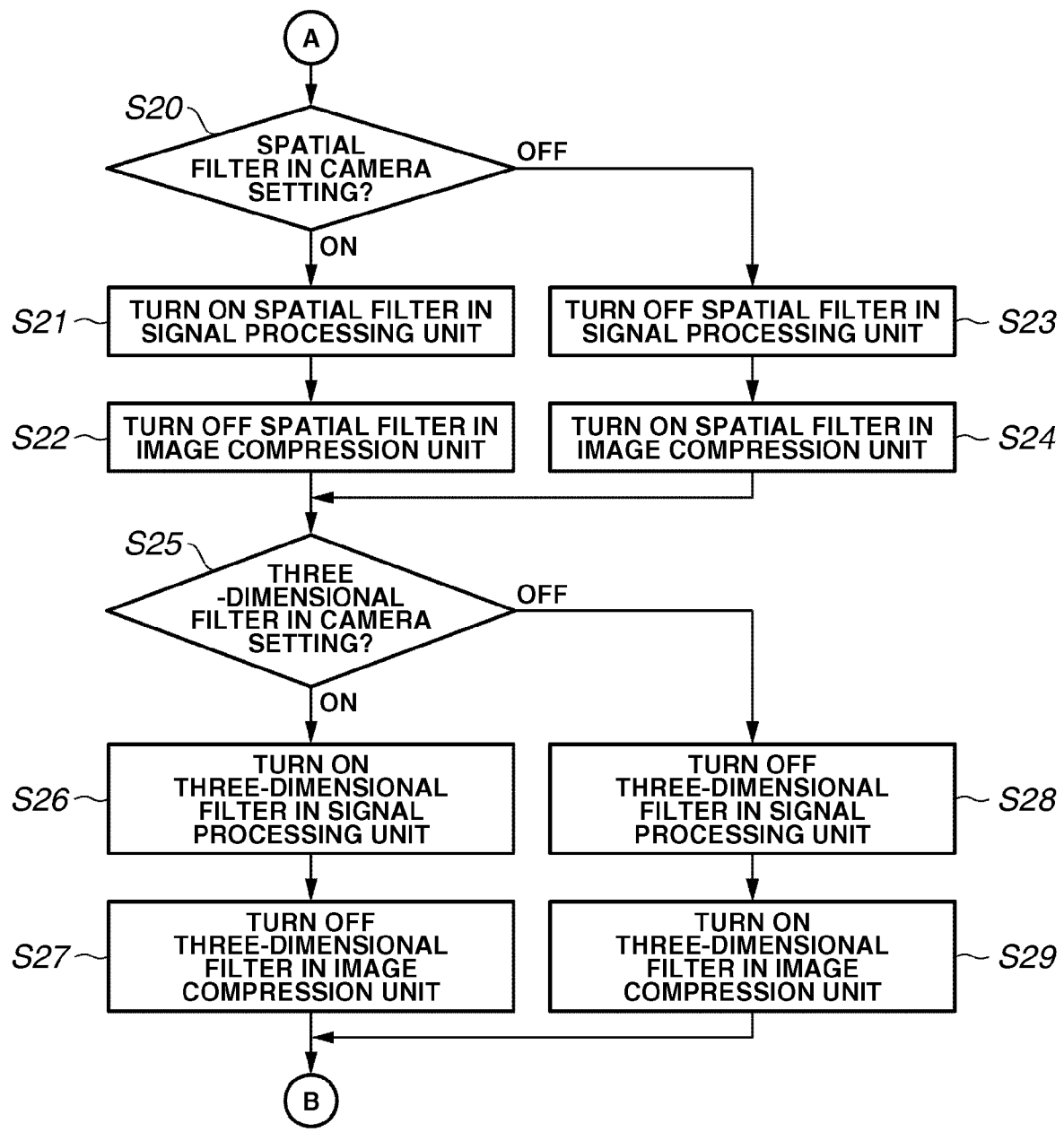
FIG. 9 is a flowchart illustrating control of a noise reduction unit according to an aspect of the present invention.
Figure 10:
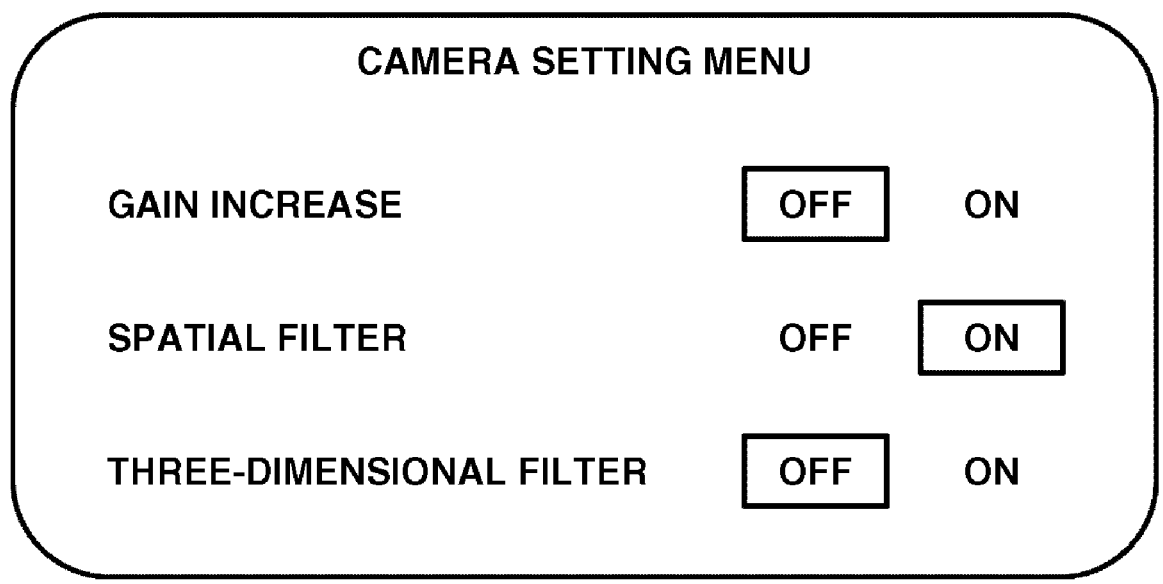
FIG. 10 illustrates an example of a setting screen for a camera setting menu according to an aspect of the present invention.

An exemplary control operation of the system control unit 44 will be described in detail with reference to FIGS. 8 to 11. FIGS. 8 and 9 are flowcharts illustrating exemplary control of the noise reduction units 20a and 30a by the system control unit 44. FIG. 10 illustrates an example of a setting screen for a camera setting menu to set the gain increase, the spatial filter, and the three-dimensional filter. FIG. 11 is a table showing the relationship among the gain increase, the spatial filter, and the three-dimensional filter. The setting screen for the camera setting menu in FIG. 10 is a graphic user interface obtained by combining a screen image displayed on the display unit 40 and an operation instruction by the operation unit 42.

In the present embodiment, with the setting screen for a camera setting menu as illustrated in FIG. 10, a user can set the gain increase, the spatial filter, and the three-dimensional filter to ON or OFF. However, as for a default setting of the camera setting menu, each of the gain increase, the spatial filter, and the three-dimensional filter are set to ON.

When an imaging start switch in the operation unit 42 is pushed, the system control unit 44 reads each setting information of the gain increase, the spatial filter, and the three-dimensional filter from a memory (not shown) (step S10). In this case, when the gain increase is set to OFF, the spatial filter is set to ON, and the three-dimensional filter is set to OFF with the camera setting menu as illustrated in FIG. 10, the system control unit 44 reads information indicating the setting contents.

The system control unit 44 determines whether the gain increase is set to ON or OFF based on the setting information read in step S10 (step S11). If the gain increase is set to OFF (OFF in step S11), the system control unit 44 outputs a control signal S to the CDS/AGC 18, which turns off the gain increase. Further, the system control unit 44 outputs control signals B2 and C2 to the image compression unit 30, which turn off the three-dimensional filter processing and spatial filter processing in the image compression unit 30 (step S12).

The system control unit 44 determines whether the spatial filter is set to ON or OFF based on the setting information read in step S10 (step S13). If the spatial filter is set to ON (ON in step S13), the system control unit 44 outputs a control signal C1 to the signal processing unit 20, which turns on the spatial filter processing in the signal processing unit 20 (step S14). On the other hand, if the spatial filter is set to OFF (OFF in step S13), the system control unit 44 outputs a control signal C1 to the signal processing unit 20, which turns off the spatial filter processing in the signal processing unit 20 (step S15).

The system control unit 44 determines whether the three-dimensional filter is set to ON or OFF based on the setting information read in step S10 (step S16). If the three-dimensional filter is set to ON (ON in step S16), the system control unit 44 outputs a control signal B1 to the signal processing unit 20, which turns on the three-dimensional filter processing in the signal processing unit 20 (step S17). On the other hand, if the three-dimensional filter is set to OFF (OFF in step S16), the system control unit 44 outputs a control signal B1 to the signal processing unit 20, which turns off the three-dimensional filter processing in the signal processing unit 20 (step S18).

Accordingly, in the present embodiment, when the gain increase is set to OFF, the spatial filter processing and three-dimensional filter processing in the image compression unit 30 are forcibly stopped, and the system control unit 44 can operate the spatial filter processing and three-dimensional filter processing in the signal processing unit 20 according to setting by a user.

On the other hand, when the gain increase is set to ON (ON in step S11), the system control unit 44 outputs a control signal S to the CDS/AGC 18*a*, which turns on the gain increase. The system control unit 44 determines whether the spatial filter is set to ON or OFF based on the setting information read in step S10 (step S20). If the spatial filter is set to ON (ON in step S20), the system control unit 44 outputs a control signal C1 to the signal processing unit 20, which turns on the spatial filter processing in the signal processing unit 20 (step S21). Further, the system control unit 44 outputs a control signal C2 to the image compression unit 30, which turns off the spatial filter processing in the image compression unit 30 (step S22).

On the other hand, if the spatial filter is set to OFF (OFF in step S20), the system control unit 44 outputs a control signal C1 to the signal processing unit 20, which turns off the spatial filter processing in the signal processing unit 20 (step S23). Further, the system control unit 44 outputs a control signal C2 to the image compression unit 30, which turns on the spatial filter processing in the image compression unit 30 (step S24).

The system control unit 44 determines whether the three-dimensional filter is set to ON or OFF based on the setting information read in step S10 (step S25). If the three-dimensional filter is set to On (ON in step S25), the system control unit 44 outputs a control signal B1 to the signal processing unit 20, which turns on the three-dimensional filter processing in the signal processing unit 20 (step S26). Further, the system control unit 44 outputs a control signal B2 to the image compression unit 30, which turns off the three-dimensional filter processing in the image compression unit 30 (step S27).

On the other hand, if the three-dimensional filter is set to OFF (OFF in step S25), the system control unit 44 outputs the control signal B1 to the signal processing unit 20, which turns off the three-dimensional filter processing in the signal processing unit 20 (step S28). Further, the system control unit 44 outputs a control signal B2 to the image compression unit 30, which turns on the three-dimensional filter processing in the image compression unit 30 (step S29)

Accordingly, in the present embodiment, when the gain increase is set to ON, the spatial filter processing and three-dimensional filter processing in the signal processing unit 20 is operated according to setting by a user, and the image compression unit 30 operates only the noise reduction processing which is not operated in the signal processing unit 20. Thus, overlapping of the noise reduction processing can be prevented.

FIG. 11 illustrates the relationship among the gain increase, the three-dimensional filter processing and spatial filter processing in the signal processing unit 20, and the three-dimensional filter processing and spatial filter processing in the image compression unit 30.

In the present embodiment, operating any one of the noise reduction unit 20*a* in the signal processing unit 20 and the noise reduction unit 30*a* in the image compression unit 30 facilitates preventing double noise reduction filter processing, thus reducing the deterioration of a recording image. Further, providing the noise reduction units 20*a* and 30*a* in the signal processing unit 20 and the image compression unit 30 facilitates applying optimum noise reduction processing to the camera image signal and the reproduced image signal.

Accordingly, for example, when a photographer wishes to output the gain-increased camera image signal with clear image to an external from the camera image signal output terminal 22, the noise reduction processing in the signal processing unit 20 can be set to ON. Further, when the photographer wishes to output a camera image signal intentionally keeping a feeling of noise to an external, the noise reduction processing in the signal processing unit 20 can be set to OFF.

In the present embodiment, the noise reduction processing includes the three-dimensional filter and the spatial filter. However, the present invention is not limited to those filters, and a filter may be one type. In this case, for example, an operation state of the noise reduction unit 30a in the image compression unit 30 can be switched according to an operation state of the noise reduction unit 20*a* in the signal processing unit 20.

Furthermore, the present embodiment exemplarily describes the three-dimensional filter and the spatial filter as the noise reduction filter. However, another filter capable of reducing noise, e.g., a median filter, can be used.

Moreover, in the present embodiment, the noise processing unit 20*a* has a similar configuration as the noise processing unit 30*a*. However, those units can have different configurations to execute the noise reduction processing.

Furthermore, in the present embodiment, the noise reduction filter processing is controlled by two steps of ON and OFF. However, the intensity of the filter processing can be gradually or continuously controlled.

Additionally, the image compression unit 30 and the image expansion unit 36 can be configured with a single integrated circuit. A single output terminal can be used for outputting of the camera image signal and outputting of the reproduced image signal.

Moreover, in the above-described embodiment, a photographer can manually set the gain, spatial filter, and three-dimensional filter in the imaging unit 12. However, the present invention can also be applied to a case where the gain, spatial filter, and three-dimensional filter in the imaging unit 12 are automatically set according to the amount of exposure for an object. In this case, for example, the system control unit 44 controls the noise reduction unit 20*a* in the signal processing unit 20 and the noise reduction unit 30*a* in the image compression unit 30 based on the relationship as illustrated in FIG. 11 according to the gain that is automatically determined by the CDS/AGC 18a.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-035925 filed Feb. 14, 2006, which is hereby incorporated by reference herein in its entirety.

What is claimed:

1. An imaging apparatus comprising:
an imaging unit configured to image an object;
a gain adjustment unit configured to adjust a gain for an image signal output from the imaging unit;
a signal processing unit configured to process the image signal, the signal processing unit including a first noise reduction unit to reduce a particular noise included in the image signal;
an image compression unit configured to compress an image signal output from the signal processing unit, the image compression unit including a second noise reduction unit to reduce a particular noise included in the image signal output from the signal processing unit; and
a control unit configured to, when the gain adjustment unit is increasing the gain for the image signal output from the imaging unit, transmit a control signal to both the first and second noise reduction unit, and one of (i) set the first noise reduction unit into an operative state and the second noise reduction unit into an inoperative state and (ii) set the second noise reduction unit into an operative state and the first noise reduction unit into an inoperative state.

2. The imaging apparatus according to claim 1, wherein at least one of the first and second noise reduction units include at least a three-dimensional filter processing unit.

3. The imaging apparatus according to claim 1, wherein at least one of the first and second noise reduction units include at least a spatial filter processing unit.

4. The imaging apparatus according to claim 1, wherein at least one of the first and second noise reduction units include at least a three-dimensional filter processing unit and a spatial filter processing unit.

5. The imaging apparatus according to claim 1, further comprising a setting unit configured to define a setting for the gain adjustment unit,
wherein the gain adjustment unit determines whether to adjust the gain according to the setting defined by the setting unit.

6. The imaging apparatus according to claim 1, further comprising an external output unit configured to output the image signal output from the signal processing unit to an external.

7. An imaging apparatus comprising:
an imaging unit configured to image an object;
a gain adjustment unit configured to adjust a gain for an image signal output from the imaging unit;
a signal processing unit configured to process the image signal, the signal processing unit including a first noise reduction unit to reduce a noise included in the image signal;
an image compression unit configured to compress an image signal output from the signal processing unit, the image compression unit including a second noise reduction unit to reduce a noise included in the image signal output from the signal processing unit; and
a control unit configured to, when the gain adjustment unit is increasing the gain for the image signal output from the imaging unit, transmit a control signal to both the first and second noise reduction unit, and set the second noise reduction unit into an inoperative state according to the gain increase and set the first noise reduction unit into an operative state.

8. The imaging apparatus according to claim 7, wherein at least one of the first and second noise reduction units include at least a three-dimensional filter processing unit.

9. The imaging apparatus according to claim 7, wherein at least one of the first and second noise reduction units include at least a spatial filter processing unit.

10. The imaging apparatus according to claim 7, wherein at least one of the first and second noise reduction units include at least a three-dimensional filter processing unit and a spatial filter processing unit.

11. The imaging apparatus according to claim 7, further comprising a setting unit configured to define a setting for the gain adjustment unit,
wherein the gain adjustment unit determines whether to adjust the gain according to the setting defined by the setting unit.

12. The imaging apparatus according to claim 11, wherein the setting unit is configured to further define a setting for the first noise reduction unit, and
wherein the first noise reduction unit determines whether to execute a noise reduction according to the setting defined by the setting unit.

13. The imaging apparatus according to claim 7, further comprising an external output unit configured to output the image signal output from the signal processing unit to an external.

14. An imaging apparatus comprising:
an imaging unit configured to image an object;
a gain adjustment unit configured to adjust a gain for an image signal output from the imaging unit;
a signal processing unit configured to process the image signal, the signal processing unit including a first noise reduction unit to reduce a noise included in the image signal;
an image compression unit configured to compress an image signal output from the signal processing unit, the image compression unit including a second noise reduction unit to reduce a noise included in the image signal output from the signal processing unit; and
a control unit configured to transmit a control signal indicating one of enabling and disabling to the gain adjustment unit, the first noise reduction unit, and the second noise reduction unit respectively,
wherein, when the gain adjustment unit is increasing the gain for the image signal output from the imaging unit in response to a control signal indicating enabling, the first noise reduction unit is set into an operative state in response to a control signal indicating enabling, and the second noise reduction unit is set into an inoperative state in response to a control signal indicating disabling.

15. The imaging apparatus according to claim 14, wherein at least one of the first and second noise reduction units include at least a three-dimensional filter processing unit.

16. The imaging apparatus according to claim 14, wherein at least one of the first and second noise reduction units include at least a spatial filter processing unit.

17. The imaging apparatus according to claim 14, wherein at least one of the first and second noise reduction units include at least a three-dimensional filter processing unit and a spatial filter processing unit.

18. The imaging apparatus according to claim 14, further comprising a setting unit configured to define a setting for the gain adjustment unit, wherein the gain adjustment unit determines whether to adjust the gain according to the setting defined by the setting unit.

19. The imaging apparatus according to claim 18, wherein the setting unit is configured to further define a setting for the first noise reduction unit, and wherein the first noise reduction unit determines whether to execute a noise reduction according to the setting defined by the setting unit.

20. The imaging apparatus according to claim 14, further comprising an external output unit configured to output the image signal output from the signal processing unit to an external.

21. An imaging apparatus comprising:
an imaging unit configured to image an object;
a gain adjustment unit configured to adjust a gain for an image signal output from the imaging unit;
a signal processing unit configured to process the image signal, the signal processing unit including a first noise reduction unit that selectively executes a plurality of noise reduction processes having different methods to the image signal;
an image compression unit configured to compress an image signal output from the signal processing unit, the image compression unit including a second noise reduction unit that selectively executes the plurality of noise reduction processes having different methods to the image signal output from the signal processing unit; and
a control unit configured to, when the gain adjustment unit is increasing the gain for the image signal output from the imaging unit, transmit a control signal to both the first noise reduction unit and the second noise reduction unit, and set the noise reduction process executed by the first noise reduction unit within the plurality of noise reduction processes to the first noise reduction unit and set the noise reduction process not executed by the first noise reduction unit within the plurality of noise reduction processes to the second noise reduction unit.

* * * * *